(12) United States Patent
Schanz et al.

(10) Patent No.: US 11,988,571 B2
(45) Date of Patent: May 21, 2024

(54) ARRANGEMENT AND METHOD FOR MEASURING A MECHANICAL LOAD ON A TEST OBJECT, WITH THE DETECTION OF CHANGES IN THE MAGNETIC FIELD

(71) Applicant: Trafag AG, Bubikon (CH)

(72) Inventors: Christoph Schanz, Frickenhausen (DE); Philipp Coerlin, Stuttgart (DE)

(73) Assignee: Trafag AG, Bubikon (CH)

( * ) Notice: Subject to any disclaimer, the term of this patent is extended or adjusted under 35 U.S.C. 154(b) by 388 days.

(21) Appl. No.: 17/426,757

(22) PCT Filed: Jan. 31, 2020

(86) PCT No.: PCT/EP2020/052431
§ 371 (c)(1),
(2) Date: Jul. 29, 2021

(87) PCT Pub. No.: WO2020/157278
PCT Pub. Date: Aug. 6, 2020

(65) Prior Publication Data
US 2022/0099507 A1    Mar. 31, 2022

(30) Foreign Application Priority Data
Jan. 31, 2019   (DE) ...................... 10 2019 102 454.4

(51) Int. Cl.
*G01L 3/10*    (2006.01)
(52) U.S. Cl.
CPC .................................. *G01L 3/105* (2013.01)

(58) Field of Classification Search
CPC ...................................................... G01L 3/105
See application file for complete search history.

(56) References Cited

U.S. PATENT DOCUMENTS

| 4,697,460 A | * | 10/1987 | Sugiyama ............. G01L 3/1435 |
| | | | 73/DIG. 2 |
| 5,412,999 A | | 5/1995 | Vigmostad et al. |

(Continued)

FOREIGN PATENT DOCUMENTS

| DE | 10 2006 017 727 A1 | 10/2007 |
| DE | 10 2016 117 529 A1 | 12/2017 |

(Continued)

*Primary Examiner* — Octavia Davis Hollington
(74) *Attorney, Agent, or Firm* — United One Law Group LLC; Kongsik Kim; Jhongwoo Peck

(57) ABSTRACT

The invention relates to an arrangement (100) for measuring a mechanical load on a test object, with the detection of changes in the magnetic field, said arrangement comprising a test object (14), which extends in a longitudinal direction L, and at least one sensor element (18) comprising a magnetic field generation device (20) for generating a magnetic field in the test object (14) and a magnetic field detection device (22) for measuring a change in the magnetic field in the test object (14). The sensor element (18) is arranged on a measurement surface (15) of the test object (14), at least one directional component of said measurement surface extending radially and/or transversely to the longitudinal direction L of the test object (14). A magnetic field is generated in the test object (14) and a change in the magnetic field in the test object (14) is measured on the measurement surface (15). The load measured is, in particular, a torque.

20 Claims, 2 Drawing Sheets

(56) References Cited

U.S. PATENT DOCUMENTS

Figure 1:
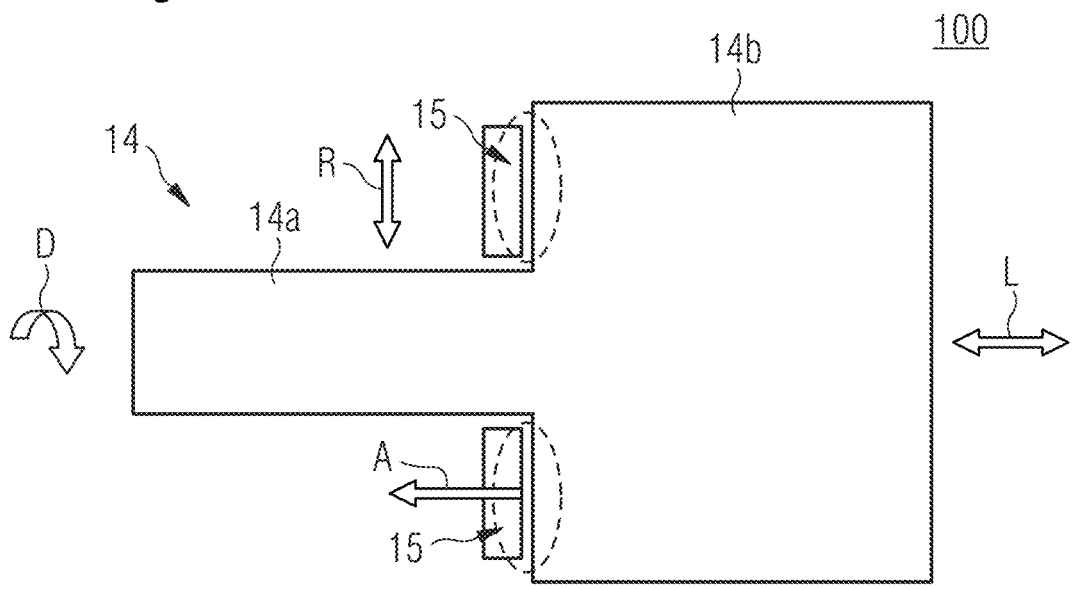

| | | | | |
|---|---|---|---|---|
| 8,001,849 B2* | 8/2011 | Weng | ...................... | G01L 3/105 |
| | | | | 73/862.333 |
| 11,473,988 B2* | 10/2022 | Odera | ...................... | G01L 3/10 |

FOREIGN PATENT DOCUMENTS

| DE | 10 2017 108 471 A1 | 10/2018 |
|---|---|---|
| DE | 10 2018 113 378 A1 | 10/2019 |

* cited by examiner

ARRANGEMENT AND METHOD FOR MEASURING A MECHANICAL LOAD ON A TEST OBJECT, WITH THE DETECTION OF CHANGES IN THE MAGNETIC FIELD

CROSS-REFERENCE TO RELATED APPLICATIONS

This application is a National Stage Entry of International Application PCT/EP2020/052431 filed on Jan. 31, 2020, which claims priority to German Application 10 2019 102 454.4 filed on Jan. 31, 2019. The aforementioned applications are incorporated herein by reference in their entireties.

The invention relates to an arrangement for measuring a mechanical load on a test object, with the detection of changes in the magnetic field. The invention further relates to a method for measuring a mechanical load on a test object, with the detection of changes in the magnetic field.

Mechanical loads are in particular torques or forces acting on a component, such as a shaft. In many applications, it is important to measure the torques or forces acting on the component or shaft.

For example, torque sensors are used to detect torques in shafts on the basis of changes in the magnetic field. Torque sensors of this type and the scientific principles behind them are described in the following literature:

01 Gerhard Hinz and Heinz Voigt "Magnetoelastic Sensors" in "Sensors", VCH Verlagsgesellschaft mbH, 1989, pages 97-152

| | |
|---|---|
| 02 | U.S. Pat. No. 3,311,818 |
| 03 | EP 0 384 042 A2 |
| 04 | DE 30 31 997 A |
| 05 | U.S. Pat. No. 3,011,340 A |
| 06 | U.S. Pat. No. 4,135,391 A |

In particular, a design of torque transducers as described in document 04 (DE 30 31 997 A1) has proven to be particularly effective for measuring torques in shafts and other measuring points.

The publication WO 2018/185018 describes a torque transducer for measuring a torque on a shaft. Here, sensor elements for detecting magnetic field changes are arranged on the surface of the shaft on a carrier plate. To reduce dependency on or to compensate for RSN ("Rotational Signal Non-Uniformity"), the carrier plate has multiple carrier plate areas, on each of which a sensor element is arranged, as well as an engagement area for engaging around the shaft. The carrier plate areas can be pivoted relative to each other by means of a flexible connection area.

It is an object of the invention to measure loads such as in particular torques and/or forces acting on a test object or component and specifically on a shaft reliably and with high accuracy, with the detection of changes in the magnetic field.

To achieve this object, according to one aspect, the invention provides an arrangement for measuring a mechanical load on a test object, with the detection of changes in the magnetic field, comprising a test object extending in its longitudinal direction, at least one sensor element comprising a magnetic field generation device for generating a magnetic field in the test object, and a magnetic field detection device for measuring a change in the magnetic field in the test object, the sensor element being arranged on a measurement surface of the test object which extends with at least one directional component radially and/or transversely to the longitudinal direction of the test object.

Preferably, the measurement surface is a frontal surface of the test object.

Advantageously, the test object is configured as a shaft for transmitting a torque.

In particular, the arrangement is designed for measuring a torque acting on the test object.

In particular, the spatial vector of the measurement surface has a direction component in the direction of the vector of the torque to be transmitted. The spatial vector of the measurement surface may also coincide with the direction of the vector of the torque to be transmitted.

For example, the test object may be configured to transmit a force in its longitudinal direction.

It is preferred that the test object is formed in one piece or monolithically.

It is preferred that the test object has a force introduction point for introducing a force or torque and a force output point for delivering the force or torque, which are spaced apart in the axial direction or longitudinal direction of the test object, wherein the measurement surface is arranged on a shoulder flank of a shoulder on the test object between the force introduction point and the force output point.

It is preferred that the test object has a first region of smaller radius and a second region of larger radius, the regions being formed integrally or monolithically without material boundaries therebetween, the measurement surface being arranged at the transition between the first region and the second region.

In particular, the spatial vector of the measurement surface may have a directional component in the direction of the vector of the force to be transmitted. The spatial vector of the measurement surface may also coincide with the direction of the vector of the force to be transmitted.

The one or more sensor elements may be configured as a PCB (printed circuit board) or a portion thereof.

In particular, the sensor element or PCB may be directly connected to the test object.

Advantageously, the sensor element or PCB is connected to the test object without contact.

Preferably, the arrangement comprises a device, in particular additional inductors, for distance measurement and/or compensation.

Advantageously, for load measurement, the arrangement comprises a device for compensating for a signal variation that occurs when the test object is rotated. In particular, the device is designed to compensate for RSN effects. For example, this can be done by the device being designed for absolute angle measurement or by an absolute angle measurement being integrated into the measurement arrangement.

Preferably, the magnetic field generating device comprises an excitation coil and the magnetic field detection device comprises, for example, multiple measuring coils.

Advantageously, multiple sensor elements and/or multiple measuring coils are preferably arranged distributed over the entire measurement surface of the test object to detect the magnetic field.

Preferably, the one or more sensor elements are manufactured using printed circuit board technology or as PCBs. Advantageously, a carrier element or carrier PCB comprises components for signal processing and/or inductors.

For example, the sensor element comprises multilayer coils, for example manufactured in PCB technology or as PCB, which are advantageously arranged on a carrier element or carrier PCB manufactured in PCB technology, for example by soldering.

In particular, the test object may comprise at least two longitudinally extending, contiguous regions of different diameters, with, for example, one or more sensor elements arranged on the exposed frontal surface of the region of larger diameter.

According to a further aspect, the invention provides a method for measuring a mechanical load on a test object, with the detection of changes in the magnetic field, the method comprising the steps of: generating a magnetic field in a test object by means of a magnetic field generation device of a sensor element; measuring a change in the magnetic field in the test object by means of a magnetic field detection device of the sensor element, wherein the sensor element is arranged on a measurement surface of the test object which extends with at least one directional component radially and/or transversely to the longitudinal direction of the test object.

Preferably, the sensor element is arranged on a frontal surface of the test object.

Particularly preferably, an arrangement according to the invention is used in the method.

Figure 2:
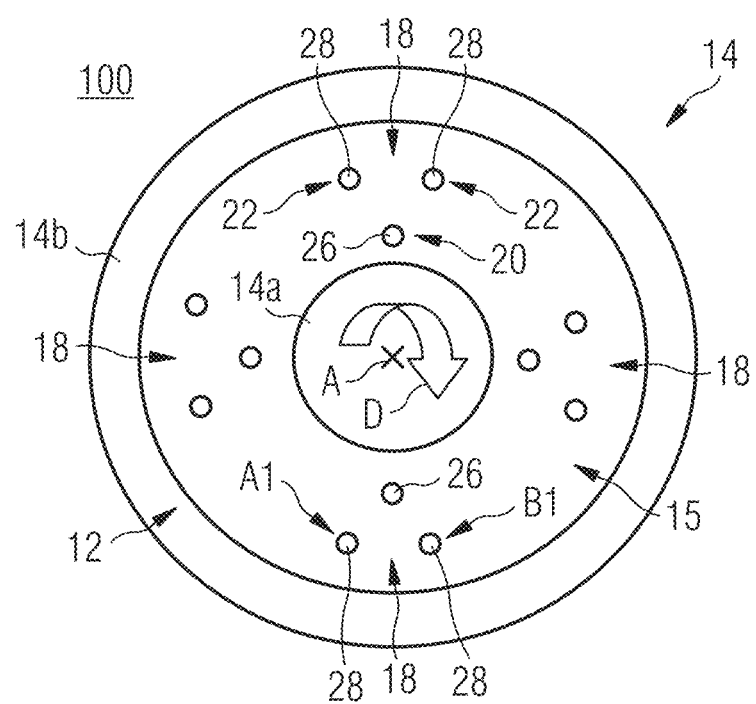
Figure 3:
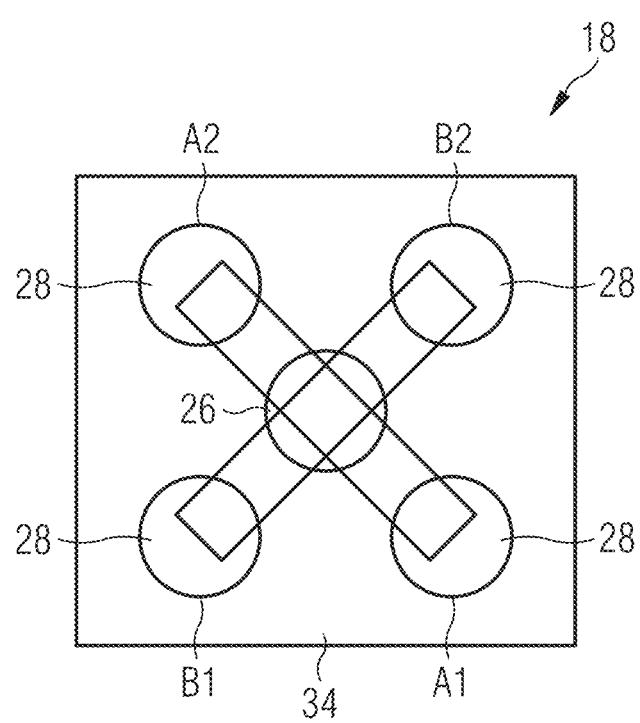

One exemplary embodiment is described in more detail below with reference to the accompanying drawings, wherein it is shown by:

FIG. 1 a schematic lateral view of a part of a shaft forming part of an arrangement according to a preferred exemplary embodiment of the invention;

FIG. 2 a schematic representation of the shaft shown in FIG. 1 with multiple sensor elements as a front view; and FIG. 3 a sensor element of an arrangement according to a further exemplary embodiment of the invention in a schematic top view.

With reference to FIGS. 1 and 2, an arrangement 100 for measuring a torque acting on a test object is explained, which is a preferred exemplary embodiment of the invention.

In FIG. 1, the test object 14 is shown as a shaft, which in this example comprises two regions 14a, 14b with different diameters. The shaft or test object 14 extends in its longitudinal direction L. Here the longitudinal direction L is the axial direction of the shaft or test object 14. A torque D acts on the test object 14, which torque is represented on the left of the Figure by an arrow running in the circumferential direction of the test object 14. The test object 14, which is formed as a shaft, serves to transmit the torque D along the longitudinal direction L. The test object 14 is formed, at least in regions and in particular on the surface, from a material with magnetostrictive properties, the permeability of which changes under mechanical load. It can be formed as a whole in one piece from such a magnetostrictive material or be coated with such a magnetostrictive material on its surface, in particular at least on the measurement surface 15, which will be explained later.

In this case, the torque can be introduced, for example, at a first end region of the shaft, for example the one shown on the left in FIG. 1, which is then an example of a force introduction point, and tapped at a second end region, here for example the one shown on the right in FIG. 1, which is then an example of a force output point.

The regions 14a, 14b are formed integrally with one another. In particular, the test object 14 is formed from one piece.

A shoulder is shown at the transition between the regions 14a, 14b, with a shoulder flank extending in the radial direction (shown at reference numeral 15).

In FIG. 2, the test object 14 formed as a shaft is shown in a front view, i.e. the longitudinal direction L or the axial direction of the test object 14 is perpendicular to the drawing plane here.

Multiple sensor elements 18 are arranged on a measurement surface 15 of the test object 14. They form a torque sensor 12. The sensor elements 18 each have a magnetic field generation device 20, which is configured to generate a magnetic field, and a magnetic field detection device 22, which is configured to detect a change in the magnetic field. In this example, the measurement surface 15 on which the sensor elements 18 are arranged is a frontal surface of the test object 14.

More specifically, the measurement surface 15 is the exposed frontal surface of the region 14b of the test object 14 which has the larger diameter. It extends radially outwardly from the outer edge of the region 14a, that is, in a radial direction R. In the example shown, the measurement surface is formed by the shoulder flank or is formed at the shoulder flank.

Torques transmitted through the shaft 14 run along the shaft in a worm shape at an angle of 45 degrees. As the shaft diameter changes from a relatively thin to a thicker point of the shaft diameter, in this case from the region 14a to the region 14b of the shaft 14, the mechanical stresses are transmitted along the frontal surface.

This enables the torque to be measured at the frontal surface, which therefore serves as the measurement surface 15. It should be noted that the course of the stress lines from the thinner to the thicker shaft geometry is not homogeneous and the stresses therefore become smaller as the diameter increases. Therefore, the torque sensor is preferably designed so that the measuring point is as close as possible to the minimum diameter of the shaft 14.

The measurement surface 15 of the test object 14 extends in the radial direction R of the test object 14, i.e. radially outward (see FIG. 1). That is, the spatial vector A of the measurement surface 15 substantially coincides with the direction of the longitudinal axis L of the test object 14.

However, it is equally possible for the measurement surface 15 to be oriented slightly obliquely or at an angle to the radial direction R of the test object 14. That is, one directional component of the measurement surface 15 extends in the radial direction R of the test object 14 or perpendicular to its longitudinal axis L, while another directional component of the measurement surface 15 extends in the axial direction of the test object 14 or in the direction of its longitudinal axis L. That is, at least one directional component of the spatial vector A of the measurement surface 15 points in the direction of the torque D to be transmitted by the test object 14 or in the longitudinal direction L.

Preferably, the angle between the spatial vector A of the measurement surface 15 and the longitudinal direction L of the test object is less than 60 degrees, more preferably less than 45 degrees, particularly preferably less than 30 degrees, and especially preferably less than 15 degrees, less than 5 degrees or also less than 1 degree. This angle thus describes the deviation of the orientation of the measurement surface 15 from the radial direction R of the test object 14.

The magnetic field generation device 20 of the respective sensor element 18 serves to generate a magnetic field in and in particular on the surface of the shaft 14. It is preferably formed by an excitation or generator coil 26.

The magnetic field detection device 22 is preferably formed by multiple measuring coils 28. It is designed to detect changes in the magnetic field due to the torque D acting on the shaft 14 due to the magnetoelastic effect. For more details on possible designs and geometries as well as on the physical principles, reference is made to the documents 01 to 04 mentioned at the beginning.

Preferably, the coils 26, 28 are designed as planar coils. Advantageously, each of the coils is engaged around a magnetic flux concentrator which preferably has a ferrite core. In the embodiment shown in FIG. 2, the coils 26, 28 are arranged in a V-shape to form a respective sensor element 18.

The arrangement of sensor elements 18 forms a torque transducer or torque sensor 12, which is used to measure the torque on the shaft 14 and is configured to be arranged on a frontal surface of the shaft 14 which forms the measurement surface 15.

The torque sensor 12 is preferably designed as a PCB (printed circuit board) or manufactured using printed circuit board technology. In this case, the sensor elements 18 can be manufactured, for example, on a carrier plate or carrier PCB or on multiple carrier plates. The carrier plate may, for example, comprise a substrate to which the planar coils and the ferrite core or magnetic flux concentrator have been applied or formed thereon using semiconductor technology methods.

For details of the PCB and the coils 26, 28, reference is made to publication WO 2018/019859 A1 and to the German patent applications Nos. 10 2018 108 869.8 and 10 2018 114 785.6.

The PCB for the frontal measurement of the torque may be applied directly to the test object 14, for example by adhesive bonding, by means of screws or generally by fastening means. The transmission of the data transmitted from the sensor elements 18 to an evaluation unit as well as the power supply can be performed wirelessly or by wireless charging.

It is also possible to mount the sensor elements 18 or the torque sensor 12 in a non-contacting manner, i.e. at a distance from the measurement surface 15. In this case, additional inductors are advantageously integrated into the arrangement for distance measurement and, if necessary, compensation, as well as, for example, an absolute angle measurement in order to compensate for RSN effects (RSN="Rotational Signal Non-Uniformity"). In this regard, reference is made in detail to the arrangement or device described in the document WO 2018/185018, to which explicit reference is made here and in which further details of the coils are also shown.

The arrangement is such that the coils 20, 22 are distributed over the entire measurement surface 15 in order to detect the magnetic field or its change. In this case, the carrier PCB, which for example also accommodates components for signal processing, is provided with inductors. Multilayer PCB coils can also be applied or soldered to the carrier PCB.

The coils 20, 22 for torque measurement are to be arranged or implemented in such a way that they see or detect maximum possible voltage curves within the test object 14. This is particularly advantageous if the force absorption on the thicker region 14*b* of the shaft 14, i.e. the part with the larger or relatively large diameter, is not homogeneous.

In the case that the torque sensor 12 is not mounted on the shaft 14 and does not rotate with the shaft 14, it is advantageous that, for example, in the case of inhomogeneous force discharge, as many small inductors as possible are integrated in order to obtain as homogeneous a signal as possible.

In the configuration of the sensor elements 18 shown in FIG. 2, a generator coil 26 as well as a first measuring coil A1 and a second measuring coil B1 are provided in each case, so that three planar coils are provided per sensor element 18.

FIG. 3 shows a further embodiment of the arrangement according to the invention, in which the sensor element 18 or the sensor elements 18 arranged on the measurement surface 15 of the test object each have a cross-shaped or X-shaped arrangement of coils. Here, the sensor element 18 is shown as a top view. In all other respects, the arrangement for torque measurement is configured as described above with reference to FIGS. 1 and 2.

In this configuration, a pair of first measuring coils A1, A2 and a pair of second measuring coils B1, B2 are provided in the respective sensor element 18, which are disposed opposite to each other on a support plate 34. At a central position between the sensing coils A1, A2, B1, B2, a generator coil 26 is arranged on the carrier plate 34. Both the generator coil 26 and each of the measuring coils 28 are formed as a planar coil.

In the following, an example of the method for measuring a mechanical load on the test object 14 is described with reference to FIGS. 1 and 2.

In the method, a magnetic field is generated in the test object 14 by means of the magnetic field generation device 20 of the sensor element 18; a change in the magnetic field in the test object 14 is measured by means of the magnetic field detection device 22 of the sensor element 18. In this case, the sensor element 18 is or will be arranged at a measurement surface 15 of the test object 14 which extends with at least one directional component radially to the longitudinal direction L of the test object 14.

For measurement, the sensor element 18 is arranged as described above at the frontal surface of the test object 14 which forms the measurement surface 15.

The features and details of the sensor elements 18 used in the method have also already been described above.

In particular, the method uses the arrangement described above. In the example described herein, the method comprises one or more of the following additional features:
- the sensor element 18 is connected directly or in a contactless manner to the test object 14;
- additional inductors are used for distance measurement and, if necessary, compensation;
- signal variations or RSN effects that occur during a rotation of the test object are compensated, preferably an absolute angle measurement being performed;
- the magnetic field generation device 20 comprises an excitation or generator coil 26;
- the magnetic field detection device 22 comprises multiple measuring coils 28;
- multiple sensor elements 18 or measuring coils 28 are arranged distributed over the measurement surface 15 of the test object 14 in order to detect the magnetic field generated therein, the distribution preferably taking place over the entire measurement surface 15;
- the sensor element 18 is manufactured in printed circuit board technology or as a PCB;
- the sensor element 18 comprises components for signal processing;
- the sensor element 18 comprises additional inductors;
- the sensor element 18 comprises multilayer coils 26, 28 manufactured in printed circuit board technology;

the sensor element 18 comprises multiple coils 26, 28 arranged on a carrier element 34 or carrier PCB fabricated in printed circuit board technology;

the test object 14 comprises two or more contiguous regions 14a, 14b extending in the longitudinal direction L and having different diameters;

one or more sensor elements 18 are disposed at the exposed frontal surface 15 of the larger diameter region 14b;

the sensor elements 18 are arranged at the exposed frontal surface 15 of the larger diameter region 14b as close as possible to the smaller diameter region 14a.

In particular, the load measurement arrangement, the torque sensor and the measurement method are designed for detecting changes in the magnetic field due to the Villari effect, and more particularly for magnetoelastic (=inverse magnetostrictive) detection of torques.

LIST OF REFERENCE SIGNS 12 torque sensor
14 shaft
14a, 14b regions
15 measurement surface
18 sensor element
20 magnetic field generation device
22 magnetic field detection device
26 generator coil
28 measuring coil
A1 first measuring coil
B1 second measuring coil
A2 first measuring coil
B2 second measuring coil
34 carrier plate
100 arrangement for load measurement
A spatial vector
D torque
L longitudinal direction
R radial direction

The invention claimed is:

1. An arrangement for measuring a mechanical load on a test object, with the detection of changes in the magnet field, comprising:
a test object (14) extending in its longitudinal direction L;
at least one sensor element (18) comprising a magnetic field generation device (20) for generating a magnetic field in the test object (14) and a magnetic field detection device (22) for measuring a change in the magnetic field in the test object (14); and
a device for compensating for a signal variation that occurs when the test object (14) is rotated,
wherein the sensor element (18) is arranged on a measurement surface (15) of the test object (14) which extends with at least one directional component radially and/or transversely to the longitudinal direction L of the test object (14).

2. The arrangement according to claim 1, characterized in that the measurement surface (15) is a frontal surface of the test object (14).

3. The arrangement according to claim 1, characterized in that
the test object (14) is designed as a shaft for transmitting a torque (D); and/or
the arrangement is designed for measuring a torque (D) acting on the test object (14); and/or
the spatial vector (A) of the measurement surface (15) has a directional component in the direction of the vector of the torque (D) to be transmitted.

4. The arrangement according to claim 1, characterized in that
the test object (14) is designed for transmitting a force in its longitudinal direction, and/or
the spatial vector of the measurement surface (15) has a directional component in the direction of the vector of the force to be transmitted, and/or
the test object is formed in one piece or monolithically; and/or
the test object has a force introduction point for introducing a force or a torque and a force output point for delivering the force or the torque, which are spaced apart in the axial direction or longitudinal direction of the test object, the measurement surface being arranged on a shoulder flank of a shoulder on the test object between the force introduction point and the force output point; and/or
the test object has a first region of smaller radius and a second region of larger radius, the regions being integrally or monolithically formed without material boundaries therebetween, the measurement surface being disposed at the transition between the first region and the second region.

5. The arrangement according to claim 1, characterized in that the sensor element (18) is directly connected to the test object (14).

6. The arrangement according to claim 1, characterized in that the sensor element (18) is connected to the test object (14) without contact.

7. The arrangement according to claim 1, further comprising a device for distance measurement and/or compensation.

8. The arrangement according to claim 1, characterized in that the magnetic field generation device (20) comprises an excitation coil (26) and the magnetic field detection means (22) comprises multiple measuring coils (28).

9. The arrangement according to claim 1, characterized in that multiple sensor elements (18) and/or multiple measuring coils (28) are arranged distributed over the measurement surface (15) of the test object (14) in order to detect the magnetic field.

10. The arrangement according to claim 1, characterized in that the sensor element (18) is manufactured in printed circuit board technology, wherein a carrier element of the sensor element (18) comprises components for signal processing and/or inductors.

11. The arrangement according to claim 1, characterized in that the sensor element (18) comprises multilayer coils manufactured in printed circuit board technology, which are arranged on a carrier element (34) manufactured in printed circuit board technology.

12. The arrangement according to claim 1, characterized in that the test object (14) comprises at least two longitudinally extending, contiguous regions (14a, 14b) of different diameters, one or more sensor elements (18) being arranged on the measurement surface (15), which is an exposed frontal surface of the region (14b) of larger diameter.

13. An arrangement for measuring a mechanical load on a test object, with the detection of changes in the magnet field, comprising:
a test object (14) extending in its longitudinal direction L; and
at least one sensor element (18) comprising a magnetic field generation device (20) for generating a magnetic field in the test object (14) and a magnetic field detection device (22) for measuring a change in the magnetic field in the test object (14), wherein the sensor element (18) is arranged on a measurement surface (15) of the test object (14) which extends with at least one directional component radially and/or transversely to the longitudinal direction L of the test object (14), and wherein the sensor element (18) is directly connected to the test object (14).

14. The arrangement according to claim 13, characterized in that the measurement surface (15) is a frontal surface of the test object (14).

15. The arrangement according to claim 13, characterized in that the test object (14) is designed as a shaft for transmitting a torque (D); and/or the arrangement is designed for measuring a torque (D) acting on the test object (14); and/or the spatial vector (A) of the measurement surface (15) has a directional component in the direction of the vector of the torque (D) to be transmitted.

16. The arrangement according to claim 13, characterized in that the test object (14) is designed for transmitting a force in its longitudinal direction, and/or the spatial vector of the measurement surface (15) has a directional component in the direction of the vector of the force to be transmitted, and/or the test object is formed in one piece or monolithically; and/or the test object has a force introduction point for introducing a force or a torque and a force output point for delivering the force or the torque, which are spaced apart in the axial direction or longitudinal direction of the test object, the measurement surface being arranged on a shoulder flank of a shoulder on the test object between the force introduction point and the force output point; and/or the test object has a first region of smaller radius and a second region of larger radius, the regions being integrally or monolithically formed without material boundaries therebetween, the measurement surface being disposed at the transition between the first region and the second region.

17. The arrangement according to claim 13, characterized in that the magnetic field generation device (20) comprises an excitation coil (26) and the magnetic field detection means (22) comprises multiple measuring coils (28).

18. The arrangement according to claim 13, characterized in that multiple sensor elements (18) and/or multiple measuring coils (28) are arranged distributed over the measurement surface (15) of the test object (14) in order to detect the magnetic field.

19. An arrangement for measuring a mechanical load on a test object, with the detection of changes in the magnet field, comprising:

a test object (14) extending in its longitudinal direction L; and at least one sensor element (18) comprising a magnetic field generation device (20) for generating a magnetic field in the test object (14) and a magnetic field detection device (22) for measuring a change in the magnetic field in the test object (14), wherein the sensor element (18) is arranged on a measurement surface (15) of the test object (14) which extends with at least one directional component radially and/or transversely to the longitudinal direction L of the test object (14), wherein the test object (14) is designed for transmitting an axial force in its longitudinal direction, and the spatial vector of the measurement surface (15) has a directional component in the direction of the vector of the axial force to be transmitted, and wherein the sensor element (18) measures the axial force applied to the test object (14).

20. The arrangement according to claim 19, characterized in that the magnetic field generation device (20) comprises an excitation coil (26) and the magnetic field detection means (22) comprises multiple measuring coils (28).

\* \* \* \* \*